Oct. 16, 1962 T. D. O'CONNOR 3,058,156
MOLD STRUCTURE FOR ENCAPSULATING DYNAMOELECTRIC MACHINERY
Filed March 11, 1960 2 Sheets-Sheet 1

INVENTOR.
THEODORE D. O'CONNOR
BY Flam and Flam
ATTORNEYS.

Oct. 16, 1962 T. D. O'CONNOR 3,058,156
MOLD STRUCTURE FOR ENCAPSULATING DYNAMOELECTRIC MACHINERY
Filed March 11, 1960 2 Sheets-Sheet 2

INVENTOR.
THEODORE D. O'CONNOR
BY
Flam and Flam
ATTORNEYS.

United States Patent Office 3,058,156
Patented Oct. 16, 1962

3,058,156
MOLD STRUCTURE FOR ENCAPSULATING DYNAMOELECTRIC MACHINERY
Theodore D. O'Connor, Milford, Conn., assignor to U.S. Electrical Motors, Inc., Los Angeles, Calif., a corporation of California
Filed Mar. 11, 1960, Ser. No. 14,282
3 Claims. (Cl. 18—36)

This invention relates to apparatus for enclosing the stator windings of a dynamoelectric machine in a plastic of the epoxy type.

Induction motors adapted to be immersed in a well for driving a pump are now well-known. To seal the stator windings against entry of well liquid by appropriate sealing devices usually entails the use of a relatively complex mechanism.

It is one of the objects of this invention to make it possible to encapsulate the stator windings, whereby the sealing problem may be simplified.

The epoxy resins are of especial utility in such encapsulated structures, as they firmly adhere to the exposed stator surfaces and form a close bond therewith. Furthermore, provisions must be made to prevent the ingress of the resin to the inner periphery of the stack of stator laminations.

It is another object of this invention to provide a mold core to be received in the bore of the stator that firmly seals against the laminations. In this way, the encapsulating plastic is prevented from contacting the inner bore of the stator structure.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings.

Figure 1:
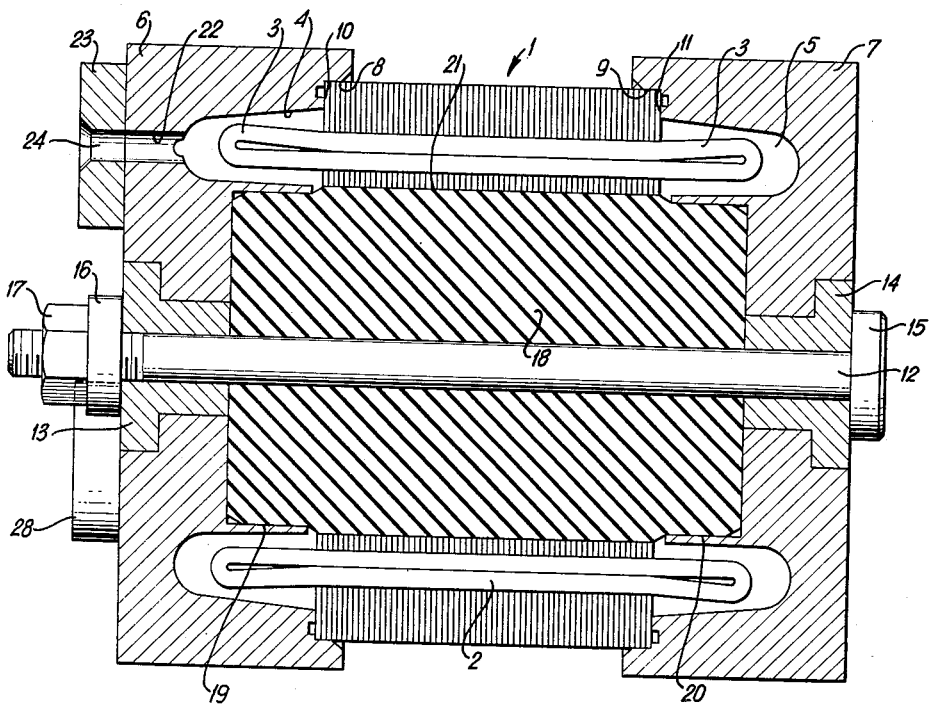
FIGURE 1 is a longitudinal sectional view of a mold structure incorporating the invention, shown as co-operating with a stator structure of an induction motor.
Figure 2:
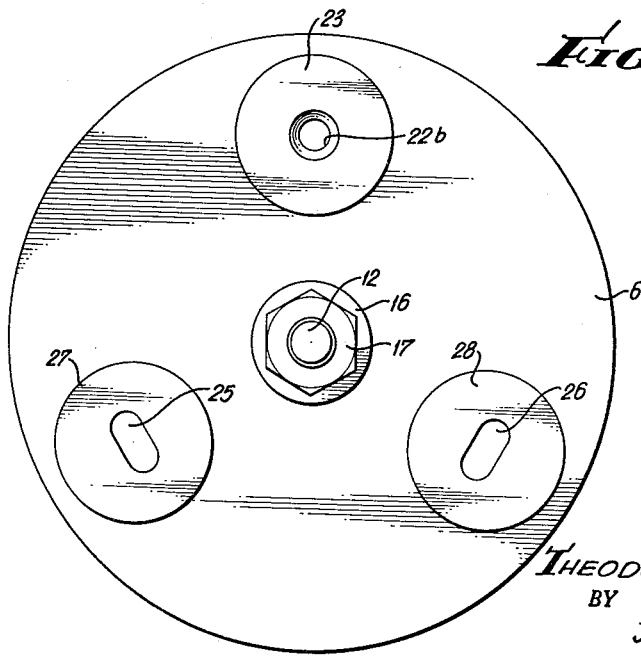
FIG. 2 is an end view thereof.

In the form shown in FIGS. 1 and 2, the stator structure 1, complete with windings 2, is shown in position in a mold structure for encapsulating end turns 3 in an epoxy-type resin. The stack of stator laminations 1 is indicated as accommodating the stator windings 2. The end turns 3 are located in the usual manner in open slots formed in the inner periphery of the stack of laminations 1.

The end turns 3 are disposed within the opposed annular mold spaces or grooves 4 and 5 of the mold elements 6 and 7. These elements 6 and 7 are preferably made of aluminum. Each mold element is formed with a bore 8 or 9 into which the ends of the stack of laminations 1 extend. Shoulders 10 and 11 form abutting surfaces for the stack ends.

In order to hold the mold members tightly against the structure 1, use is made of a bolt 12 passing through bushings 13 and 14 inserted in the mold elements 6 and 7. The bolt member 12 is provided with a head 15. A collar 16 at the left-hand end encompasses the bolt, and a nut 17 holds the assembly together.

The bushings 13 and 14 are purposely made of steel, or the like, so as to be better able to withstand the stresses imposed on the mold sections or members, which are preferably made of aluminum.

Located between the two mold members 6 and 7 is a core member 18. This core member 18 is preferably made of resilient material, such as rubber or other synthetic plastic. It has reduced ends 19 and 20 fitting into counterbores in the mold members 6 and 7. Its outer periphery 21 is maintained in sealing contact with the slots in which the windings 2 are located. In this way, none of the plastic which is passed into the annular spaces 4 and 5 can enter the bore of the stator stack 1.

In order to ensure a good seal between the core member 18 and the stack of laminations 1, the overall length of the core member 18 is made somewhat larger than the space between the two core members 6 and 7. Accordingly, as the bolt 12 is tightened, there is a slight expansion of the outer periphery of the member 18 urging it tightly into sealing relation with the slots.

An opening 22 is provided for the ingress of heated epoxy material or other plastic to form a convenient inlet passage. A collar 23, joined to member 6, forms an extension aperture 24 aligning with the aperture 22.

The flowing epoxy resin or equivalent is distributed to both cavities 4 and 5 by the aid of the slots located in the laminated structure 1.

Additional openings 25 and 26 (FIG. 2) serve as vents. These openings are formed in collars 27 and 28 attached to the left-hand mold member 6.

Figure 3:
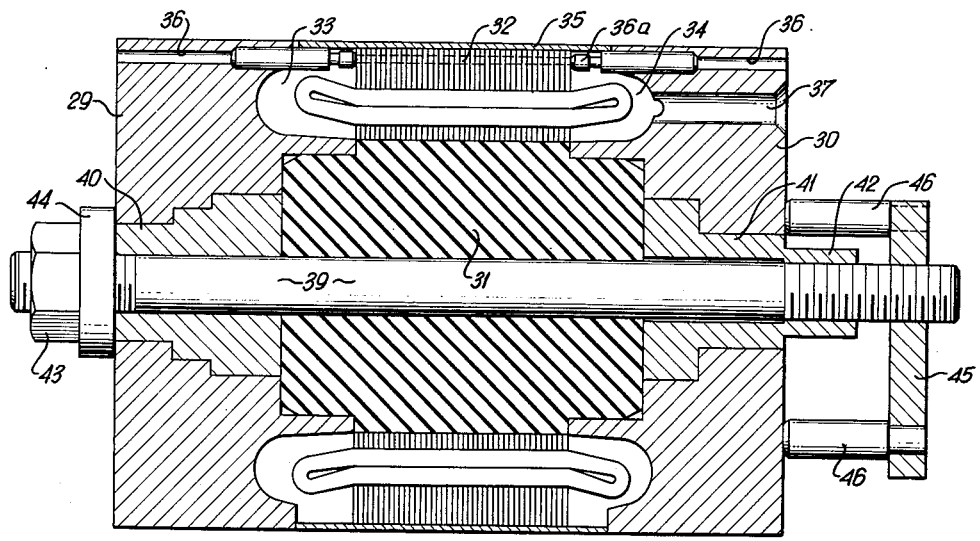
FIG. 3 is a longitudinal sectional view, similar to FIG. 1, of a modified form of the invention.
Figure 4:
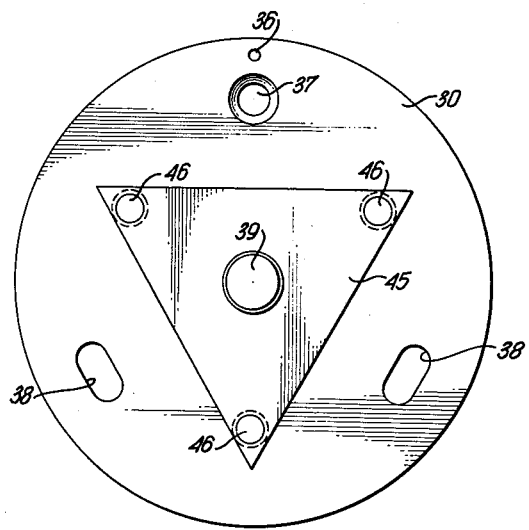
FIG. 4 is an end view taken from the right-hand side of FIG. 3.

In the form of the invention illustrated in FIGS. 3 and 4, there are mold members 29 and 30 of the same general configuration as those illustrated in the form of FIG. 1. In this instance, an expandable rubber core 31 is clamped between the two members 29 and 30 to seal the slots of the stator structure 32. Annular mold cavities 33 and 34 are defined by the aid of the core members 29 and 30, as well as by the sheet metal casing member 35. This casing member 35 forms a part of the exterior frame for the motor utilizing the stator structure.

The injection aperture 36 in member 30 is utilized for the introduction of the heated fluent epoxy resin plastic.

In order to provide for openings in the encapsulating material for the passage of bolts to attach bearing supports to the stator, rods 36a pass through the bolt openings in the structure 32. These rods form cores in the cavities 33 and 34.

Vents 37 and 38 are provided in the mold member 30.

In order to attach the core member 31 to the mold members 29 and 30, use is made of a through bolt 39. This through bolt passes through steel bushings 40 and 41 accommodated in appropriate counterbored axial openings in the members 29 and 30. This bolt or rod passes with clearance through the right-hand bushing 41 and is threaded into a hexagonal extension 42 of the bushing 41. By the aid of this hexagonal extension, the core member 31 is compressed, as by the aid of the nut 43 and the interposed collar 44 which engages the mold member 29.

A clamp plate or nut 45 of generally triangular form is threadedly engaged with the right-hand end of the bolt or stud 39 to draw the mold members 29 and 30 together. From this triangular plate 45 depend three posts 46, contacting the right-hand surface of the mold member 30. Appropriate turning of bushing 41 by the application of a wrench or hexagon portion 42 serves to urge the clamp plate into or out of clamping position.

In both forms of the invention, the mold members, when assembled with the stator laminations, are supported in the vertical position so as to bring the injection apertures into a convenient place for the flow of the thermo-setting plastic material. Further, by the use of cores, such as 18 and 31, made of rubber, an adequate seal can be effected for the interior periphery of the stator laminations 1 or 32.

In both forms, it is advantageous to ensure easy separation of the mold structure from the stator structure. Appropriate mold release lining can be provided for this purpose.

The inventor claims:

1. In apparatus including a stator having a stack of stator laminations together defining a bore and slots opening into the bore, said stator also including windings in the slots having end turns extending beyond the end laminations, the combination therewith of: a rubber core extending through and beyond opposite ends of the bore; a pair of separate end members engaging opposite ends of the core, and each providing substantially annular recesses in which the corresponding end turns are accommodated; at least one of said end members being detachable from said core; said end members having parts opposed to the respective stator ends; said core member normally spacing at least one of the end members from the corresponding stator end such that the end members simultaneously engage the corresponding stator ends only upon compression of said core; said core in its normal unflexed state having clearance relative to the bore; and releasable clamping means for drawing the end members together for simultaneous engagement with the corresponding stator ends to form therewith a space for injection of plastic encapsulating material, and to compress said core; said core being confined by said end members so that it enters the slots of the stator laminations upon compression thereof to seal said stator bore with respect to encapsulating plastic.

2. In apparatus including a stator having a stack of stator laminations together defining a bore and slots opening into the bore, said stator also including windings in the slots having end turns extending beyond the end laminations, the combination therewith of: a rubber core extending through the bore; a pair of separate end members engaging opposite ends of the core, and each providing substantially annular recesses in which the corresponding end turns are accommodated; at least one of said end members being detachable from said core; said end members having parts opposed to the respective stator ends; said core member normally spacing at least one of the end members from the corresponding stator end such that the end members simultaneously engage the corresponding stator ends only upon compression of said core; a rod passing through the core and the end members; abutment means at one end of the rod for engaging one of the end members; a threaded insert for the other of the parts and engageable with the rod at a place spaced inwardly of its other end for compressing the core; and a nut carried at the said other end of said rod and reacting against said other end member for drawing the end members together; said core being confined by said end members so that it enters the slots of the stator laminations upon compression thereof to seal said stator bore with respect to encapsulating plastic.

3. In apparatus including a stator having a stack of stator laminations together defining a bore and slots opening into the bore, said stator also including windings in the slots having end turns extending beyond the end laminations, the combination therewith of: a rubber core extending through the bore; a pair of separate end members engaging opposite ends of the core, and each providing substantially annular recesses in which the corresponding end turns are accommodated; at least one of said end members being detachable from said core; said end members having parts opposed to the respective stator ends; said core member normally spacing at least one of the end members from the corresponding stator end, such that the end members simultaneously engage the corresponding stator ends only upon compression of said core; and releasable clamping means for drawing the end members together for simultaneous engagement with the corresponding stator ends to form therewith a space for injection of plastic encapsulating material, and to compress said core; said core being confined by said end members so that it enters the slots of the stator laminations upon compression thereof to seal said stator bore with respect to encapsulating plastic; said clamping means including a rod passing through the core and the end members, one of the end members having an internally threaded insert for threadedly engaging the rod adjacent one end thereof, and a plate also threadedly engaging the rod at its said one end and having posts engaging the said one of the end members.

References Cited in the file of this patent

UNITED STATES PATENTS

| | | |
|---|---|---|
| 2,029,147 | Anderson | Jan. 28, 1936 |
| 2,032,483 | Isenberg | Mar. 3, 1936 |
| 2,749,456 | Luenberger | June 5, 1956 |
| 2,763,910 | Braatelien | Sept. 25, 1956 |
| 2,967,346 | McMaster et al. | Jan. 10, 1961 |

FOREIGN PATENTS

| | | |
|---|---|---|
| 941,837 | Germany | Apr. 19, 1956 |